(12) United States Patent
Tsubouchi et al.

(10) Patent No.: US 7,073,333 B2
(45) Date of Patent: Jul. 11, 2006

(54) MASTER CYLINDER

(75) Inventors: Kaoru Tsubouchi, Aichi (JP); Katsuhiro Mita, Aichi (JP); Hideaki Iijima, Aichi (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 11/110,877

(22) Filed: Apr. 21, 2005

(65) Prior Publication Data
US 2005/0235642 A1 Oct. 27, 2005

(30) Foreign Application Priority Data
Apr. 27, 2004 (JP) ............................. 2004-130780
Mar. 30, 2005 (JP) ............................. 2005-096923

(51) Int. Cl.
*B60T 11/22* (2006.01)
(52) U.S. Cl. ...................................................... 60/585
(58) Field of Classification Search ................... 60/585, 60/587, 588
See application file for complete search history.

(56) References Cited

U.S. PATENT DOCUMENTS 6,438,955 B1 8/2002 Chiba et al.
6,637,201 B1 * 10/2003 Hirayama et al. ............ 60/585

FOREIGN PATENT DOCUMENTS

JP 57194150 A * 11/1982
JP 2000/142365 5/2000

* cited by examiner

*Primary Examiner*—Thomas E. Lazo
(74) *Attorney, Agent, or Firm*—Buchanan Ingersoll PC

(57) ABSTRACT

A master cylinder includes a cylinder body and primary and secondary pistons slidably received in the cylinder body, thereby defining first and second pressure chambers in the cylinder body. The first and second pressure chambers communicate with a reservoir through first and second fluid passages, respectively. During automatic brake control such as traction control or vehicle stability control, hydraulic fluid is drawn from the reservoir through the first and second pressure chambers. A throttle valve is received in each of the first and second fluid passages. The throttle valves are adapted to open while the master cylinder is inoperative and to close under backflow pressure when hydraulic fluid flows from the pressure chambers toward the reservoir. The throttle valves each include a floating valve body and a valve seat. The valve seat has its radially outer portion liquid-tightly joined and fixed to the cylinder body so that the fixed position of the valve seat and the lowermost position of the floating valve body are determined by the cylinder body.

7 Claims, 4 Drawing Sheets

MASTER CYLINDER

BACKGROUND OF THE INVENTION

The present invention relates to a master cylinder used in a vehicle hydraulic brake system.

Many of today's motor vehicles are equipped with various automatic braking functions including traction control (TRC) and electronic stability control (ESC).

Some of vehicle hydraulic brake systems having one or more of such automatic brake functions are designed to draw hydraulic fluid (brake fluid) from the reservoir through a pressure chamber defined in the master cylinder for automatic braking.

It is desired that this type of hydraulic brake system have a master cylinder structured such that hydraulic fluid can flow from the reservoir into the pressure chamber without encountering any substantial resistance while the master cylinder is inoperative, and any fluid flow from the pressure chamber toward the reservoir during an initial stage of braking is restricted. A master cylinder that satisfies this requirement is disclosed in JP patent publication 2000-142365.

As shown in FIG. 6, this master cylinder includes throttle valve mechanisms 35 each including a floating valve body 36 and received in one of fluid passages 33 and 34 through which pressure chambers defined in a cylinder body communicate with the interior of the reservoir. When the pressure in the pressure chambers falls below the pressure in the reservoir, the valve mechanisms 35 are adapted to open, allowing hydraulic fluid to flow from the reservoir into the pressure chambers as indicated by chain line in FIG. 7.

When hydraulic fluid begins to flow from the pressure chambers toward the reservoir, the floating valve body of each valve mechanism will float in hydraulic fluid due to a pressure difference between the pressure chambers and the interior of the reservoir until pressed against a valve seat 38. After the valve mechanisms 38 have thus closed, hydraulic fluid flows only through a restricted passage 37 formed in the floating valve body 36 in a restricted amount as shown in FIG. 6.

Thus, in spite of the fact that hydraulic fluid can be smoothly supplied from the reservoir into the pressure chamber while the master cylinder is inoperative, as soon as the master cylinder is actuated, brake pressure is instantly generated in the pressure chamber, thereby minimizing the idle stroke of the piston at the initial stage of braking. Suitable reaction force is applied to the input members of the brake system due to the fact that hydraulic fluid flows through the restricted passage at a restricted flow rate. This prevents self-induced vibrations and noise produced at the initial stage of actuation of a negative-pressure booster (if the brake system has such a booster) due to insufficient reaction force. This in turn ensures smooth brake pedal feel.

As shown in FIGS. 6 and 7, the floating valve body 36, of which the initial position is determined by the cylinder body 31, is adapted to be seated on the valve seat 38, which is formed on the reservoir 32 at its portion 39 connected to the cylinder body 31. Thus, the master cylinder disclosed in JP patent publication 2000-142365 has the following problems.

(1) The stroke L of the floating valve body 36 tends to vary according to the dimension of a seal member disposed between cylinder body 31 and the connecting portion 39 or the degree of compression of the seal member, thereby destabilizing the operation of the throttle valve. This leads to variation in the performance of the master cylinder itself, thereby lowering its reliability.

(2) Since the valve mechanisms 35 of this patent publication are basically of the normally open type, small foreign objects that have infiltrated through the filter into the reservoir may deposit on the floating valve body 36. If such foreign objects get stuck between the valve body 36 and the valve seat 38, a gap may develop between the valve body 36 and the valve seat 38 that is even greater in sectional area than the restricted passage 37. Thus, when the brake pedal is depressed, hydraulic fluid can flow from the pressure chamber into the reservoir not only through the restricted passage 37 but through the gap present between the valve body 36 and the valve seat 38. This makes it difficult to sufficiently restrict the fluid flow from the pressure chamber into the reservoir.

(3) Fluid pressure applied to the restricted passage in the initial stage of braking (hereinafter referred to as "backflow pressure") acts as a force to push up the reservoir, thereby detrimentally affecting the seal at the connecting portion 39, which in turn increases the possibility of leak of fluid through the seal.

An object of the present invention is to improve the reliability of a master cylinder including a throttle vale provided in a fluid passage between the reservoir and a pressure chamber to suppress backflow of hydraulic fluid into the reservoir at a low pressure, thereby improving pedal feel, by stabilizing the function of the throttle valve. Another object of the invention is to provide a master cylinder which is small in size of the connecting portion between the cylinder body and the reservoir in spite of the fact the master cylinder includes a throttle valve, and which is simple in structure and high in productivity.

SUMMARY OF THE INVENTION

According to the present invention, there is provided a master cylinder comprising a cylinder body, a primary piston and a secondary piston that are received in the cylinder body so as to be arranged in series with each other, thereby defining a first pressure chamber and a second pressure chamber in the cylinder body, the cylinder body carrying cups with which the primary and secondary pistons are in sliding contact, a reservoir having its interior in communication with the first pressure chamber through a first fluid passage and with the second pressure chamber through a second fluid passage, the primary and secondary pistons being configured to be moved under external force to close the first and second fluid passages, thereby pressurizing hydraulic fluid in the first and second pressure chambers and discharging the thus pressurized hydraulic fluid through output ports, throttle valves each received in one of the first and second fluid passages, and comprising a valve seat having its radially outer portion liquid-tightly joined and fixed to the cylinder body, and a floating valve body configured to be moved into contact with the valve seat under a pressure difference when hydraulic fluid is returned from the first and second pressure chambers into the reservoir, thereby closing the throttle valve, wherein a fixed position of the valve seat and a lowermost position of the floating valve body are determined by the cylinder body.

Since the fixed position of the valve seat and the lowermost position of the floating valve body are determined by the cylinder body, the displacement of the floating valve body can be set with high accuracy. It is therefore possible to reduce variation in the displacement of the valve body, thereby improving the reliability of the end product.

Since the displacement of the floating valve body can be set with high accuracy, the valve can be closed quickly so that the restricted passage can be activated quickly while keeping a high suction rate of hydraulic fluid during automatic braking.

Also, since the valve seat of each throttle valve is fixed to the cylinder body, any backflow pressure applied to the floating valve body in the initial stage of braking is borne by the cylinder body and will not be transmitted to the reservoir, particularly to its connecting portion. This prevents the possibility of leak of fluid through the seal at the connecting portion.

From another aspect of the invention, there is provided a master cylinder comprising a cylinder body, a primary piston and a secondary piston that are received in the cylinder body so as to be arranged in series with each other, thereby defining a first pressure chamber and a second pressure chamber in the cylinder body, the cylinder body carrying cups with which the primary and secondary pistons are in sliding contact, a first return spring for the primary piston which is mounted in the first pressure chamber and having a suspension structure, a second return spring for the secondary piston which is mounted in the second pressure chamber, the first return spring having a greater spring force than the second return spring when the master cylinder is in an initial, inoperative state, a reservoir having its interior in communication with the first pressure chamber through a first fluid passage and with the second pressure chamber through a second fluid passage, the primary and secondary pistons being configured to be moved under external force to close the first and second fluid passages, thereby pressurizing hydraulic fluid in the first and second pressure chambers and discharging the thus pressurized hydraulic fluid through output ports, a throttle valve received in the second fluid passage, and comprising a valve seat having its radially outer portion liquid-tightly joined and fixed to the cylinder body, and a floating valve body configured to be moved into contact with the valve seat under a pressure difference when hydraulic fluid is returned from the first and second pressure chambers into the reservoir, thereby closing the throttle valve, wherein a fixed position of the valve seat and a lowermost position of the floating valve body are determined by the cylinder body.

In this arrangement, by setting the force of the return spring for the primary piston to a sufficiently large level so that the volume of the first pressure chamber will not change after the brake pedal has been depressed until the reservoir is completely isolated from the reservoir by the primary piston, no backflow pressure will be produced in the first pressure chamber in the initial stage of braking, which eliminates the necessity to provide a throttle valve in the fluid passage between the first pressure chamber and the reservoir. Thus, it is possible to further simplify and reduce the size of the master cylinder while maintaining good brake pedal feel.

Preferably, the valve seat has a cylindrical portion liquid-tightly fitted in a mounting hole in which the valve body is mounted, a claw formed at a top end of the cylindrical portion and engaged in an annular groove formed in the mounting hole, thereby mounting the valve body to the cylinder body, and a bottom formed at a bottom end of the cylindrical portion, the floating valve body being capable of abutting the bottom.

With this arrangement, the valve seat is rigidly fixed to the cylinder body. The valve seat can be easily mounted to the cylinder body too.

Preferably, the floating valve body is configured to be locally supported by the cylinder body with a space defined under the floating valve body.

With this arrangement, any foreign objects that are mixed into the reservoir will sink into the space under the floating valve body without depositing on the floating valve body. This eliminates the possibility of change in the displacement of the floating valve body due to foreign objects stuck between the floating valve body and the valve seat, thereby stabilizing the operation of the throttle valve.

Preferably, the floating valve body has a specific gravity greater than the hydraulic fluid.

With this arrangement, while the master cylinder is inoperative, the floating valve body will sink by its own weight, separating from the valve seat, so that the throttle valve will be kept open. This further reduces the possibility of foreign objects depositing on the floating valve body and getting stuck between the valve body and the valve seat. Thus, as soon as the brake pedal is depressed, the throttle valve will close instantly so that hydraulic fluid will flow only through the restricted passage at a restricted flow rate. Also, since means for biasing the floating valve body toward its open position is not necessary, the valve is simple in structure.

Preferably, the first fluid passage includes a portion formed in an upper portion of the cylinder body to extend substantially parallel to an axis of the cylinder body. With this arrangement, the portion of the first fluid passage coupled to the reservoir can be provided close to the portion of the second fluid passage coupled to the reservoir, so that a smaller reservoir can be used.

In the arrangement in which the throttle valve is provided in either of the fluid passage between the first pressure chamber and the reservoir and the fluid passage between the second pressure chamber and the reservoir, a backup ring is preferably provided behind a secondary cup disposed around the primary piston for isolating the interior of the cylinder body from open air to support the secondary cup, thereby keeping the secondary cup in the groove formed in the inner periphery of the cylinder body.

In the arrangement in which a throttle valve is provided in either of the first and second fluid passages, if a large clearance is formed between the outer periphery of the primary piston and the radially inner surface of the cylinder piston near its opening, the secondary cup may slip out of the groove in which the secondary cup is received under a pressure difference between the first pressure chamber and open air if high backflow pressure is produced in the first pressure chamber. The backup ring will prevent this from happening. But if the clearance between the outer periphery of the primary piston and the radially inner surface of the cylinder body is sufficiently small, the secondary cup will not slip out of the groove even without the backup ring.

BRIEF DESCRIPTION OF THE DRAWINGS

Other features and objects of the invention will become apparent from the following description made with reference to the accompanying drawings, in which.

DETAILED DESCRIPTION OF THE PREFERRED EMBODIMENTS

Figure 1:
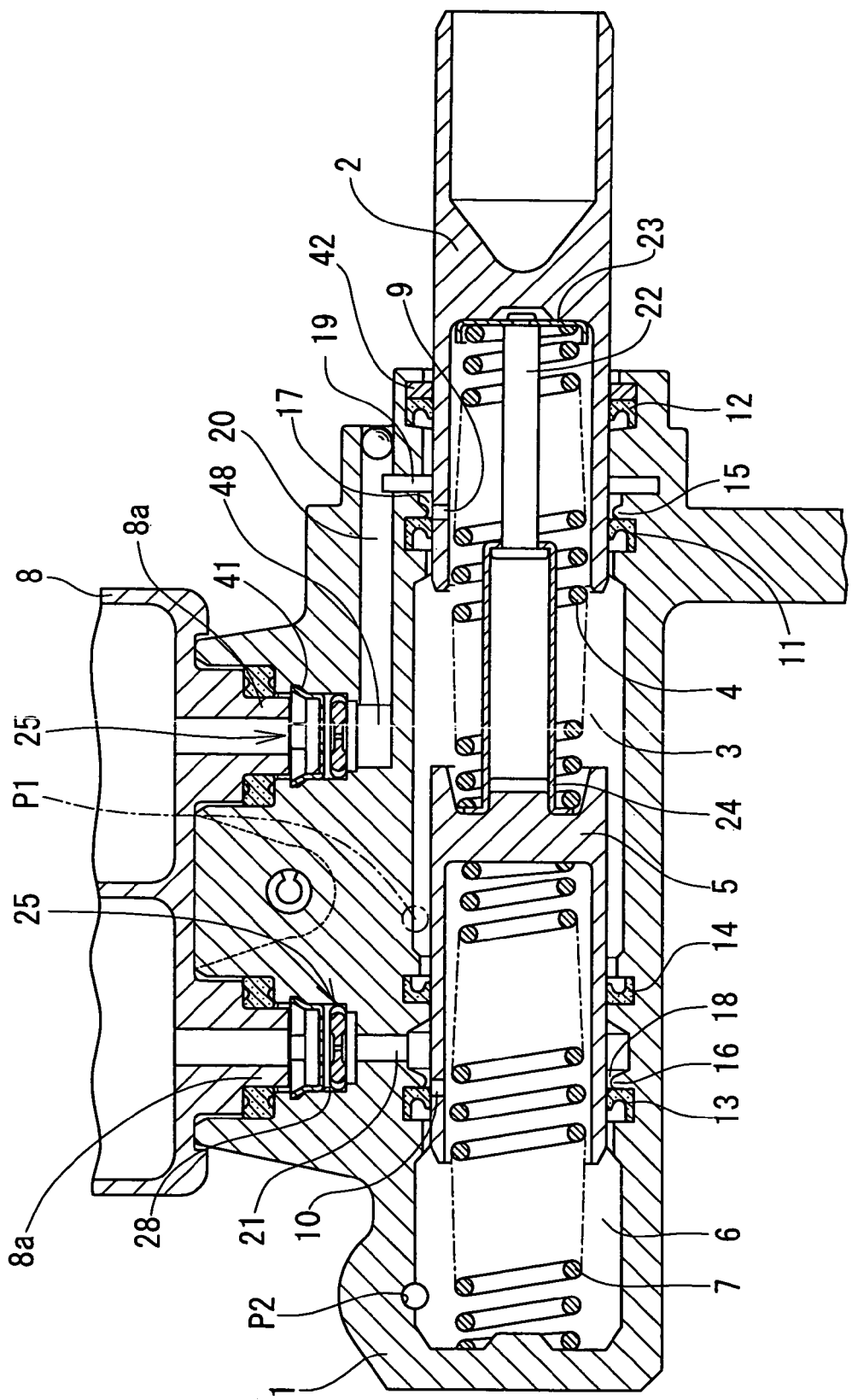
FIG. 1 is a sectional view of a master cylinder of a first embodiment according to the present invention.

Now referring to FIGS. 1–5, the master cylinder of the first embodiment of the invention, shown in FIG. 1, includes a cylinder body 1, a primary piston 2 slidably mounted in the cylinder body 1, and a secondary piston 5 slidably mounted in the cylinder body 1 forwardly (leftwardly in FIG. 1) of the primary piston 2. In the cylinder body 1, a first pressure chamber 3 is defined between the primary and secondary pistons 2 and 5, and a second pressure chamber 6 is defined between the secondary piston 5 and the end wall of the cylinder body 1. Brake hydraulic pressure is generated in each of the first and second pressure chambers 3 and 6 when hydraulic fluid filling the respective pressure chambers 3 and 6 is pressurized by the primary piston 2 and the secondary piston 5, respectively. Return springs 4 and 7 for the primary and secondary pistons 2 and 5 are mounted in the first and second pressure chambers 3 and 6, respectively. The master cylinder further includes a reservoir 8. Hydraulic pressures generated in the first and second pressure chambers 3 and 6 are discharged through output ports P1 and P2, respectively.

Primary cups 11 and 13, a secondary cup 12, and a pressure cup 14 are received in grooves formed in the inner periphery of the cylinder body 1, with the primary cup 11 sealing the outer periphery of the primary piston 2, the secondary cup 12 sealing the outer periphery of the primary piston 2, thereby isolating the interior of the cylinder body 1 from open air, the primary cup 13 sealing the outer periphery of the secondary piston 5, and the pressure cup 14 sealing the outer periphery of the secondary piston 5, thereby isolating the first pressure chamber 3 from the reservoir 8.

Immediately rearwardly (rightwardly in FIG. 1) of the respective primary cups 11 and 13, annular walls 15 and 16 are integrally formed on the inner periphery of the cylinder body 1 to support the backs of the primary cups 11 and 13.

The annular walls 15 and 16 have inner diameters greater than the outer diameters of the primary and secondary pistons 2 and 5 to define gaps between the annular walls 15 and 16 and the primary and secondary cups 2 and 5.

The primary piston 2 and the secondary piston 5 are formed with a plurality of circumferentially aligned piston ports 9 and 10 adapted to communicate with annular passages 17 and 18 formed behind the annular walls 15 and 16, respectively. The cylinder body 1 is formed with an annular groove 19, fluid passages 20 and 21 and mounting holes 28 and 48 through which the annular passages 17 and 18 communicate with the reservoir 8. The fluid passage 20 extends substantially parallel to the axis of the cylinder body 1.

Figure 3:
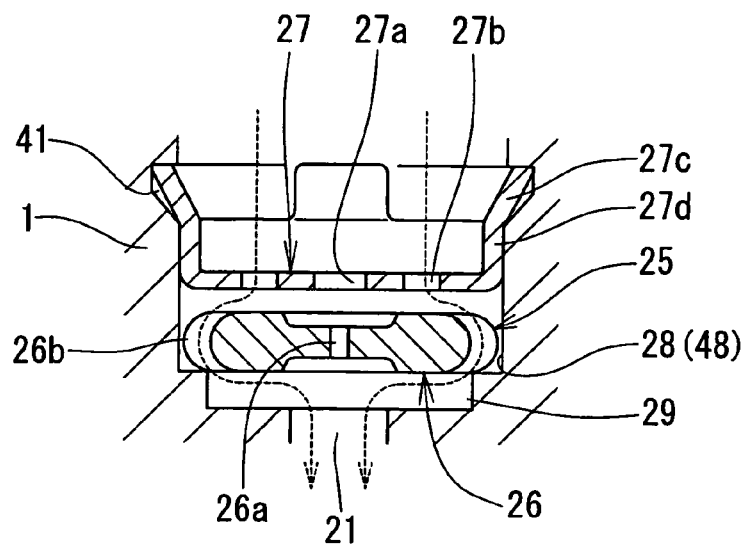
FIG. 3 is a sectional view of a throttle valve used in the present invention in its open position.

The master cylinder of the first embodiment includes two throttle valves 25 each received in one of the mounting hole 48, through which the first pressure chamber 3 communicates with the reservoir, and the mounting hole 28, through which the second pressure chamber 6 communicates with the reservoir 8. As shown in FIG. 3, each throttle valve 25 comprises a floating valve body 26 and a valve seat 27 and are disposed under one of connecting portions 8a (see FIG. 1) of the reservoir 8. The throttle valves 25 are both mounted to the cylinder body 1.

The floating valve body 26 is made of a material having a greater specific gravity than hydraulic fluid, such as a polyamide resin or a hard rubber, and has a restricted passage (orifice) 26a formed centrally therein, a flat top, and grooves 26b formed in the radially outer periphery thereof through which hydraulic fluid can flow.

The valve seat 27 is dish-shaped, and is formed with a central fluid passage 27a and a peripheral fluid passage 27b in its disk portion. The valve seat 27 is separated from the floating valve body 26 by a predetermined distance while the latter is in contact with the bottom of the mounting hole 28 or 48. The valve seat 27 has a cylindrical portion 27d extending upwardly from the outer edge of the disk portion and pressed liquid-tightly against the wall of the mounting hole 28 or 48, and a claw 27c formed at the top end of the cylindrical portion 27d and engaged in a groove 41 formed in the cylinder body 1. The valve seat 27 is thus securely held in position by the cylinder body 1. The claw 27c may have the same diameter as the cylindrical portion 27d before the valve seat 27 is mounted to the cylinder body 1. In this case, after inserting the valve seat 27 into the mounting hole 28 or 48, the claw 27c is bent radially outwardly until it engages in the groove 41 formed in the cylinder body 1. Alternatively, the valve seat 27 may have the shape shown in FIGS. 3 and 4 before being mounted to the cylinder body 1. In this case, the valve seat 27 is inserted into the mounting hole 28 (48) while resiliently deforming the claw 27c until the claw 27c comes out of the hole 28 (48) and expands radially outwardly, engaging in the groove 41 formed in the cylinder body 1. The restricted passage 26a may be formed between the contact surfaces of the valve seat 27 and the floating valve body 26.

The return spring 4 for the primary piston 2 is disposed between a first retainer 23 to which is fixed a pin 22 and a second retainer 24 slidable relative to the pin 22, and thus has a suspension structure. But in this embodiment, such a suspension type return spring 4 may be replaced with an ordinary coil spring because there is the throttle valve 25 between the first pressure chamber 3 and the reservoir 8.

In the first embodiment, besides the throttle valve 25 provided between the second pressure chamber 6 and the reservoir, another throttle valve 25 is provided between the first pressure chamber 3 and the reservoir 8, and a relatively large clearance is formed between the outer periphery of the primary piston 2 and the radially inner surface of the cylinder body 1 near its opening. Thus, when a high backflow pressure is produced in the first pressure chamber 3, the secondary cup 12 may slip out of the cylinder body. To prevent this from happening, a backup ring 42 is provided behind the secondary cup 12 to support the secondary cup 12.

In the first embodiment, a large clearance is formed between the outer periphery of the primary piston 2 and the radially inner surface of the cylinder body 1 near its opening so that the inner periphery of the cylinder body can be machined easily. The large clearance necessitates the backup ring 42 to prevent the secondary cup 12 from slipping out of the cylinder body 1. But if this clearance is sufficiently small, the backup ring 42 is not necessary.

While the master cylinder of the first embodiment is inoperative, and no backflow pressure is acting on the floating valve body 26, the floating valve body 26 rests on the bottom of the mounting hole 28 or 48 as shown in FIG. 3, keeping the throttle valve 25 open. Thus, as soon as automatic brake control is activated, hydraulic oil can be smoothly drawn from the reservoir 8 into the first and second pressure chamber 3 and 6 as shown by dotted lines in FIG. 3 without encountering any substantial resistance.

Figure 4:
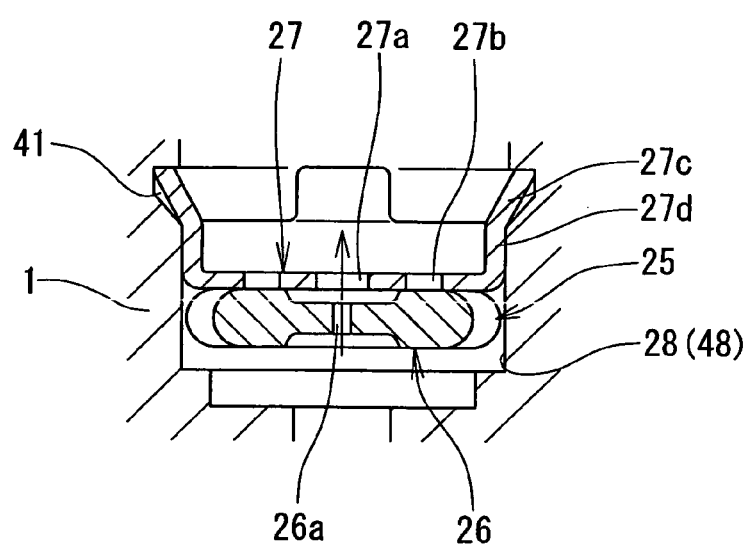
FIG. 4 is a sectional view of the throttle valve of FIG. 3 in its closed position.

When the brake pedal is depressed by the driver, the primary piston 2 and the secondary piston 5 advance, thereby reducing the volumes of the first and second pressure chambers 3 and 6. Hydraulic fluid in the respective pressure chambers thus begins to flow toward the reservoir 8. Under the hydraulic pressure difference produced due to the backflow of hydraulic fluid, the floating valve body 26 of each throttle valve 25 in the mounting hole 28 or 48 will be instantly pushed up until pressed against the valve seat 2 as shown in FIG. 4. The throttle valves 25 thus instantly close. Once the throttle valves 25 close, hydraulic fluid in the pressure chambers flows only through the respective restricted passages 26a toward the reservoir 8 in a restricted amount. Thus, the pressures in the first and second pressure chambers 3 and 6 will increase. The thus increased pressures in the pressure chambers 3 and 6 are transmitted through the return springs and the input members to the brake pedal, thereby applying suitable reaction force to the brake pedal. The driver thus has good pedal feel. Since hydraulic fluid can flow from the pressure chambers toward the reservoir only in a restricted amount while the brake pedal is being depressed, a booster for amplifying the brake operating force produced by the driver and transmitting it to the master cylinder will never produce self-induced vibrations, noise or any other uncomfortable phenomena due to insufficient reaction force.

Figure 2:
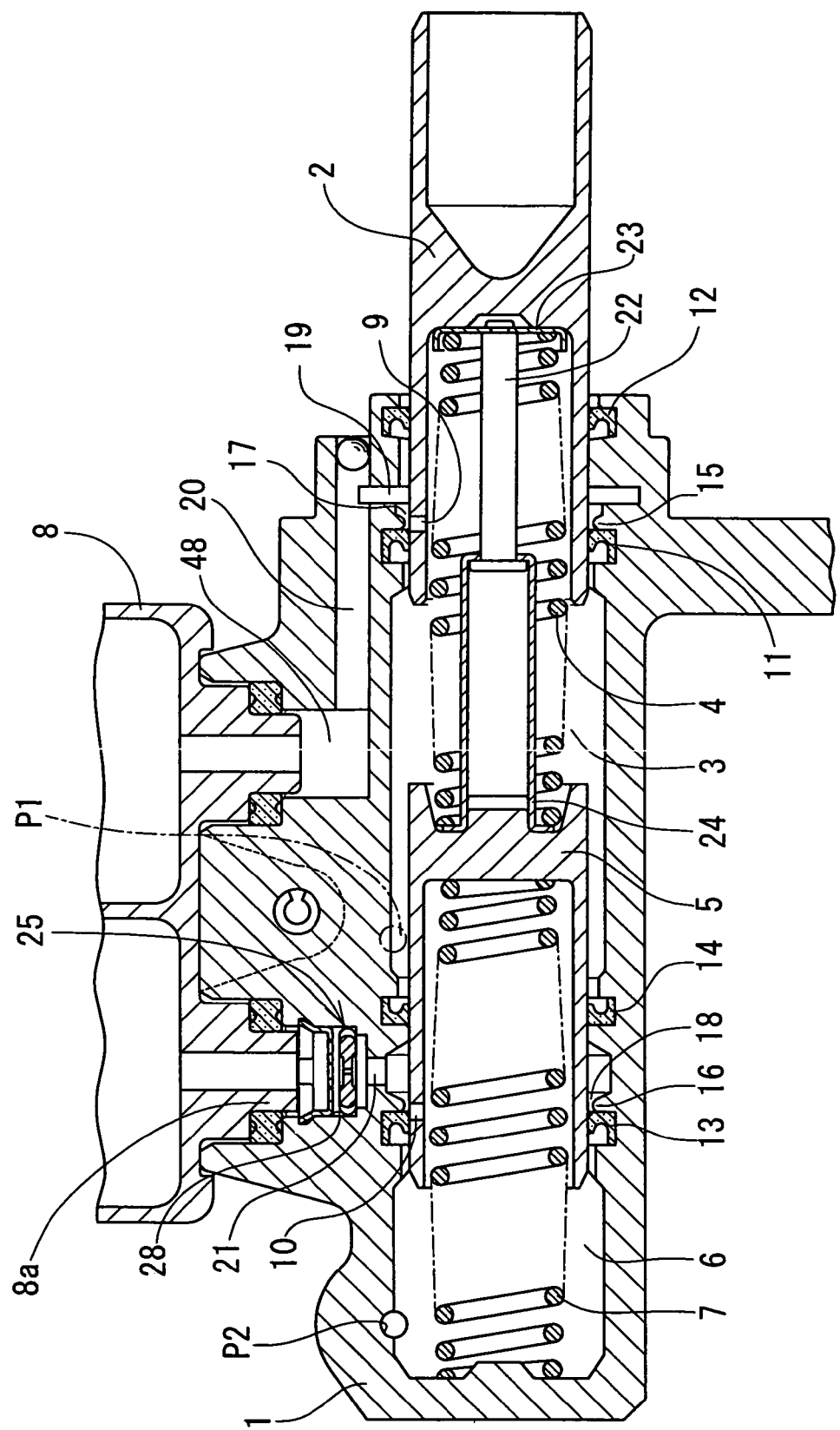
FIG. 2 is a sectional view of a master cylinder of a second embodiment according to the present invention.

FIG. 2 shows the second embodiment, in which the return spring 4 for the primary piston 2 is disposed between a first retainer 23 to which is fixed a pin 22 and a second retainer 24 slidable relative to the pin 22, and thus has a suspension structure. While the master cylinder is inoperative, the return spring 4 has a spring force greater than the return spring 7 for the secondary piston 5. With this arrangement, it is possible to omit the throttle valve 25 received in the mounting hole 48 in the first embodiment. The master cylinder of the second embodiment is thus simpler in structure. The force of the return spring 4 is determined so as not to yield to the pressure produced in the second pressure chamber 6 until the primary piston 2 is pushed in and the piston ports 9 are completely closed by the primary cup 11. Thus, it is possible to omit the backup ring 42 shown in FIG. 1. Elements not mentioned here are identical to those of the first embodiment. Thus, these elements are designated by identical numerals and their description is omitted.

In the second embodiment, since the return spring 4 has a spring force greater than the return spring 7 while the master cylinder is inoperative, in the initial stage of brake operation, only the volume of the second pressure chamber 6 decreases with the volume of the first pressure chamber 3 unchanged. Thus, it is possible to omit the throttle valve 25 between the first pressure chamber 3 and the reservoir. This makes it possible to further simplify the master cylinder and to reduce its size.

In either of the first and second embodiments, when the floating valve body 26 is pressed against the valve seat 27 under the backflow pressure, the valve seat 27 is reliably retained in the mounting hole 28 or 48 because the cylindrical portion 27d of the valve seat 27 is pressed in the mounting hole 28, and the claw 27c is engaged in the groove 41 formed in the cylinder body 1. In particular, when the valve body 26 is pressed against the valve seat 27 under backflow pressure, the backflow pressure serves to wedge the claw 27c into the groove 41 formed in the cylinder body 1, thereby securely holding the valve seat 27 in the cylinder body 1.

Since the stationary position of the valve seat 27 and the lowermost position of the floating valve body 26 are both determined by the cylinder body 1, the distance therebetween when the floating valve body 26 is at the lowermost position can be determined with high accuracy. This improves the response of the valve when the valve is closed.

When the floating valve body 26 is at its lowermost position, it is supported only partially by the cylinder body 1 with a space 29 defined under the floating valve body 26. Thus, any foreign objects in hydraulic fluid will sink into the space 29, and will never get stuck between the valve seat 27 and the floating valve body 26.

Since the valve seat 27 can be mounted to the cylinder body 1 in a simple manner, productivity of the master cylinder of the present invention is extremely high. Still, the valve 25 is reliable enough because the valve seat 27 is rigidly held by the cylinder body 1 even when subjected to backflow pressure.

Figure 5:
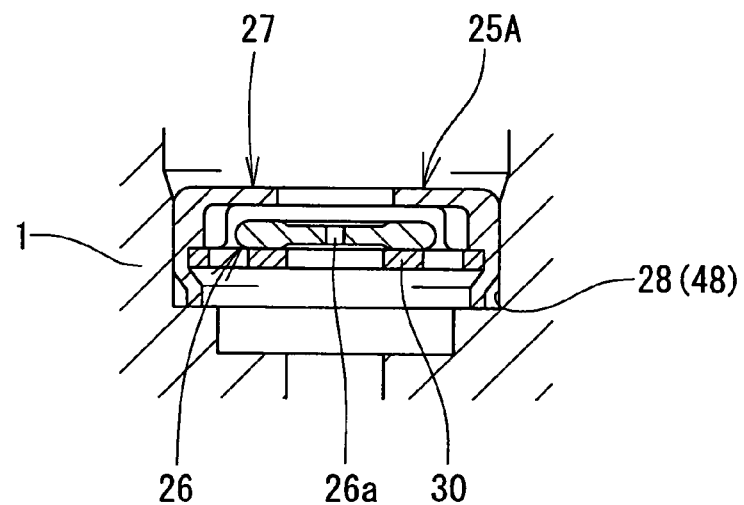
FIG. 5 is a sectional view of a different throttle valve usable in the present invention.
Figure 6:
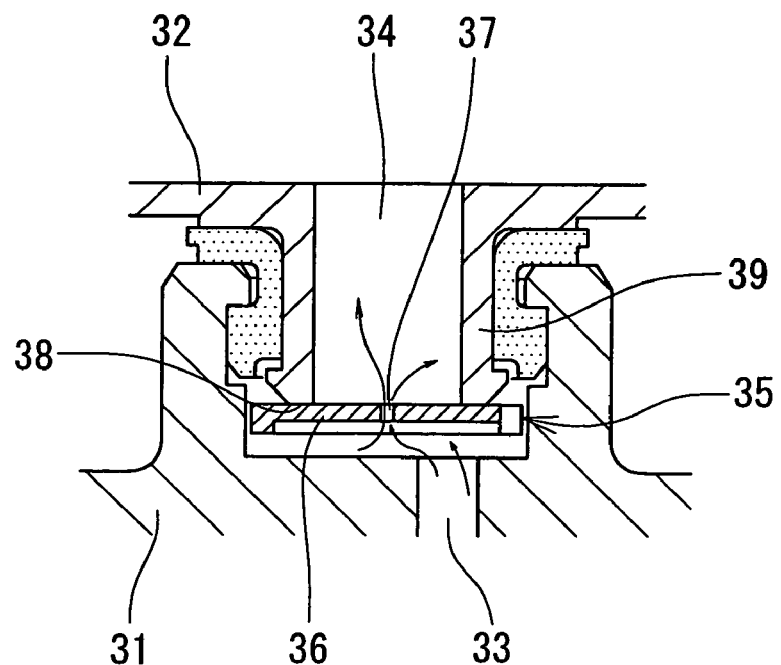
FIG. 6 is a sectional view of a throttle valve disclosed in JP patent publication 2000-142365 when in the closed position.
Figure 7:
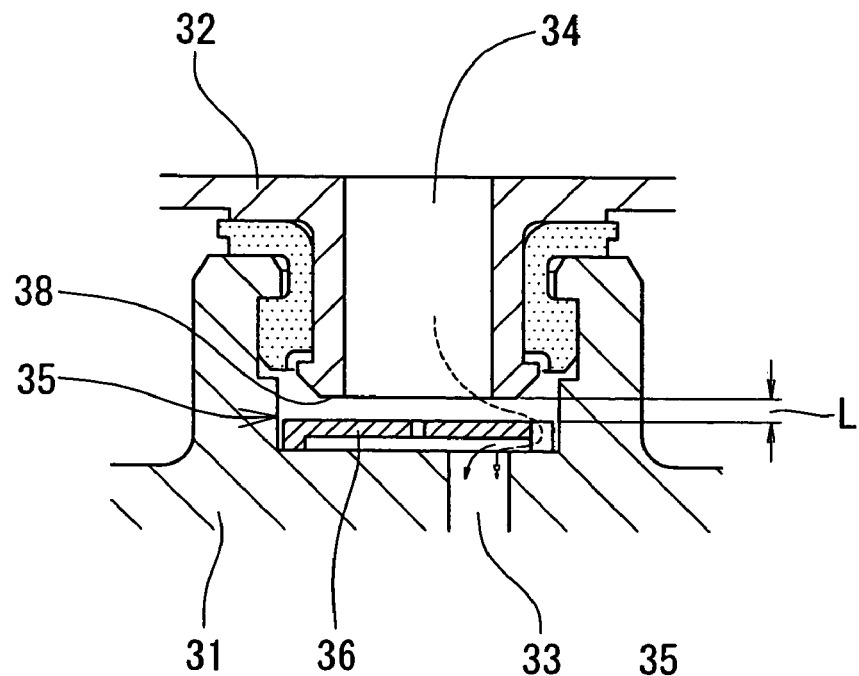
FIG. 7 is a sectional view of the throttle valve of FIG. 6 in its open position.

FIG. 5 shows a throttle valve 25A which can be used instead of the throttle valve 25. The throttle valve 25A comprises a floating valve body 26, a bottom plate 30 supporting the floating valve body 26, and a valve seat 27. The members 26, 27 and 30 are assembled together beforehand as a valve unit. The valve unit is liquid-tightly pressed into the mounting hole 28 (48) so that the backflow pressure applied to the floating valve body 26 in the initial stage of braking is borne by the cylinder body 1. Instead of pressing the valve unit into the mounting hole, the valve unit may be fixed to the cylinder body 1 by positioning the upper portion of the valve unit with a snap ring that is in engagement with the periphery of the mounting hole.

What is claimed is:

1. A master cylinder comprising:
   a cylinder body;
   a primary piston and a secondary piston that are received in said cylinder body so as to be arranged in series with each other, thereby defining a first pressure chamber and a second pressure chamber in said cylinder body;
   said cylinder body carrying cups with which said primary and secondary pistons are in sliding contact;
   a reservoir having its interior in communication with said first pressure chamber through a first fluid passage and with said second pressure chamber through a second fluid passage;
   said primary and secondary pistons being configured to be moved under external force to close said first and second fluid passages, thereby pressurizing hydraulic fluid in said first and second pressure chambers and discharging the thus pressurized hydraulic fluid through output ports;
   throttle valves each received in one of said first and second fluid passages, and comprising a valve seat having its radially outer portion liquid-tightly joined and fixed to said cylinder body, and a floating valve body configured to be moved into contact with said valve seat under a pressure difference when hydraulic fluid is returned from said first and second pressure chambers into said reservoir, thereby closing said throttle valve, wherein a fixed position of said valve seat and a lowermost position of said floating valve body are determined by said cylinder body.

2. The master cylinder of claim 1 wherein each of said first and second fluid passages includes a mounting hole, said valve seat of each of said throttle valves having a cylindrical portion liquid-tightly fitted in the corresponding mounting hole, a claw formed at a top end of said cylindrical portion and engaged in an annular groove formed in the mounting hole, thereby mounting said valve body to said cylinder body, and a bottom formed at a bottom end of said cylindrical portion, said floating valve body being capable of abutting said bottom.

3. The master cylinder of claim 2 wherein at said lowermost position, said floating valve body of each of said throttle valves is configured to be locally supported by said cylinder body with a space defined under said floating valve body.

4. The master cylinder of claim 2 wherein said floating valve body of each of said throttle valves has a specific gravity greater than said hydraulic fluid.

5. The master cylinder of claim 1 wherein said first fluid passage includes a portion formed in an upper portion of said cylinder body to extend substantially parallel to an axis of said cylinder body.

6. The master cylinder of claim 1 wherein one of said cups is a secondary cup received in a groove formed in an inner periphery of said cylinder body so as to be disposed around said primary piston for isolating the interior of said cylinder body from open air, the master cylinder further comprising a backup ring provided behind said secondary cup to support said secondary cup, thereby keeping said secondary cup in said groove.

7. A master cylinder comprising:
   a cylinder body;
   a primary piston and a secondary piston that are received in said cylinder body so as to be arranged in series with each other, thereby defining a first pressure chamber and a second pressure chamber in said cylinder body;
   said cylinder body carrying cups with which said primary and secondary pistons are in sliding contact;
   a first return spring for said primary piston which is mounted in said first pressure chamber and having a suspension structure;
   a second return spring for said secondary piston which is mounted in said second pressure chamber;
   said first return spring having a greater spring force than said second return spring when said master cylinder is in an initial, inoperative, state;
   a reservoir having its interior in communication with said first pressure chamber through a first fluid passage and with said second pressure chamber through a second fluid passage;
   said primary and secondary pistons being configured to be moved under external force to close said first and second fluid passages, thereby pressurizing hydraulic fluid in said first and second pressure chambers and discharging the thus pressurized hydraulic fluid through output ports;
   a throttle valve received in said second fluid passage, and comprising a valve seat having its radially outer portion liquid-tightly joined and fixed to said cylinder body, and a floating valve body configured to be moved into contact with said valve seat under a pressure difference when hydraulic fluid is returned from said first and second pressure chambers into said reservoir, thereby closing said throttle valve, wherein a fixed position of said valve seat and a lowermost position of said floating valve body are determined by said cylinder body.

* * * * *